United States Patent [19]
Langenecker

[11] Patent Number: 5,593,099
[45] Date of Patent: Jan. 14, 1997

[54] APPARATUS FOR PRODUCING SOLID FERTILIZER FROM LIQUID SUBSTANCES SUCH AS MANURE FROM LIVERSTOCK OR SLUDGE

[76] Inventor: Bertwin Langenecker, St. Martiner Weg 9, A-8570 Voitsberg, Austria

[21] Appl. No.: 167,477

[22] Filed: Dec. 14, 1993

[51] Int. Cl.⁶ .................................................. B02C 23/36
[52] U.S. Cl. ...................... 241/46.02; 241/46.08; 241/DIG. 38
[58] Field of Search ............................ 241/46.02, 46.08, 241/46.11, 188.2, DIG. 38

[56] References Cited

U.S. PATENT DOCUMENTS

| | | | |
|---|---|---|---|
| 1,732,775 | 10/1929 | Shaver | 241/46.02 |
| 2,148,447 | 2/1939 | Dundas et al. | 241/DIG. 38 X |
| 2,505,674 | 4/1950 | Knight | 241/46.02 X |
| 2,641,453 | 6/1953 | Teale | 241/46.17 X |
| 3,464,636 | 9/1969 | Byers | 241/46.17 X |
| 3,635,409 | 1/1972 | Brewer | 241/DIG. 38 X |
| 3,910,775 | 10/1975 | Jackman | 241/DIG. 38 X |
| 4,877,531 | 10/1989 | Burkett | 241/DIG. 38 X |

FOREIGN PATENT DOCUMENTS

| | | | |
|---|---|---|---|
| 1101918 | 3/1961 | Germany | 241/46.11 |
| 990289 | 1/1983 | U.S.S.R. | 241/46.02 |

Primary Examiner—Timothy V. Eley
Attorney, Agent, or Firm—Herbert L. Lerner; Laurence A. Greenberg; Werner H. Stemer

[57] ABSTRACT

A method for producing solid fertilizer from liquid manure or from sludge includes mixing the same with harvest leftovers. The liquid substance (manure, sludge) is intimately mixed with the harvest leftovers during grinding. The solids are ground to a particle size of a few microns. The particles adsorb and absorb the liquid substance fully, so that a solid fertilizer product results which neither smells nor endangers the ground water. All of the valuable materials from the liquid substance and from the harvest leftovers are retained in the finished product, which is a high potency fertilizer. The fertilizer can be applied with methods and devices which are conventionally used in agriculture. An apparatus for performing the method includes a grinder/blender which is supplied independently from a harvest leftover storage and from a liquid substance storage. The materials are measured for exact mixture and the pH value may be adjusted.

5 Claims, 3 Drawing Sheets

APPARATUS FOR PRODUCING SOLID FERTILIZER FROM LIQUID SUBSTANCES SUCH AS MANURE FROM LIVESTOCK OR SLUDGE

BACKGROUND OF THE INVENTION

Field of the Invention

The invention relates to a method and an apparatus for producing solid fertilizer from liquid substances such as manure from livestock or sludge.

Liquid manure production around the world is enormous. The escape of gases from liquid manure is not only malodorous but it also contributes to the global greenhouse effect and the much publicized ozone hole. Moreover, liquid manure is a danger to the groundwater when—in the old, time-honored way—the liquid manure, in its original form, is spread, as fertilizer on agricultural areas by spraying onto or other introduction into the soil. Similar problems are associated with the immense worldwide production of sludge, for instance from water purification systems.

There is accordingly a need for alternative methods that solve these problems associated with liquid manure and sludge in an environmentally appropriate manner and that at the same time enable the utilization, for soils used in agriculture, of the valuable substances contained in the fertilizer.

Two basic principles have been heretofore known in the art of processing liquid manure. In one of the two versions, the solids contained in the manure (amounting to approximately 3 to 8% by weight) are separated from the liquid phase, and the two phases are further processed separately from one another. The solid component contains the substances that are of high value as fertilizers; but more than 90% of the manure is liquid, and even after separation from the solid component it is "polluted" with residual compounds of dissolved substances (above all, nitrogen compounds). It is, accordingly, illegal for the liquid manure to be fed into surface waters such as brooks, rivers, lakes or ponds.

A system operating by the separation principle was put into operation in Fehring (in the Styria province of Austria) in 1990. There, the solids are separated out of the liquid manure and dried with the aid of methane produced in the anaerobic treatment of the liquid portion of the liquid manure. Additives are then blended with the dried solid, thus increasing the fertilizer value of the product. The liquid component of the manure is subjected to an anaerobic pretreatment and a chemical post-treatment, but until now it was never possible to achieve the degree of purity required by environmental laws. Feeding into surface waters, therefore, is illegal. Moreover, because of the expenditure for components and equipment for a liquid manure processing system employing the aforementioned principle, such high investment and operating costs are involved that the affected livestock keepers could hardly afford them without generous aid from governmental aid programs.

In the second principle for processing liquid manure, the manure is not separated into its solid component and its liquid phase. Instead, the manure is left in its original form and is blended with harvest waste. In the simplest possible form, in livestock keeping this is done on straw bedding in the animal stalls in the stable or barn; after some time, after lodging there and rotting with ensuing composting, the muck in the stalls turns into a fertilizer, of the kind that has for eons been spread on the fields to be fertilized. However, this does not solve the complicated environmental problem presented by liquid manure.

An improvement to the situation had been hoped for with the method described in a document entitled HUT04218. In it, agricultural waste is collected on stubble fields (or at other locations where it occurs) and stored, compacted into bales. When liquid manure is then to be prepared, the baled waste is supposed to be comminuted with a bale plucking machine and chopped up until pieces of straw or other waste that are less than approximately 25 mm in size are created, which can easily be blended with the liquid manure. According to that document, the resultant mixture should either be usable as fertilizer after composting or should be usable as fuel for heat production in automatically controlled boiler systems.

The mixture of harvest leftovers in liquid manure produced by the method described in that document is in fact handy and easy to manipulate, as this inventor has been able to confirm in series of tests for replicating and checking the efficiency of the method described. Nevertheless, the liquid manure is neither fully absorbed nor bound by the pieces of waste that are up to 25 mm in size, nor can any chemical reactions of the liquid manure with the waste be demonstrated; on the contrary, there is a heterogeneous mixture of waste in liquid manure, from which the unmodified liquid manure, whose consistency is unchanged, can drain out and seep into the soil beneath, which does not eliminate the threat to groundwater, nor is the malodorous escape of gases from the liquid manure prevented. Accordingly, the dangers to the atmosphere are not obviated and pollution is still rampant. Nor are these grave disadvantages even perceptibly —and certainly not completely—eliminated by composting the mixture as recommended.

SUMMARY OF THE INVENTION

It is accordingly an object of the invention to provide a method and an apparatus for producing solid fertilizer from liquid substances such as manure from livestock or sludge, which overcomes the hereinafore-mentioned disadvantages of the heretofore-known devices of this general type and which provides an economical, nonpolluting way to solve the present worldwide environmental problem, as outlined above, of the large quantities of liquid manure and sludge which are being produced.

With the above and other objects in view there is provided, in accordance with the invention, a method for producing solid fertilizer, which comprises:

feeding a liquid substance selected from the group consisting of livestock manure and sludge to a mixing apparatus;

feeding harvest leftovers to the mixing apparatus; and blending the harvest leftovers with the liquid substance and simultaneously comminuting the harvest leftovers to a particle size in the range of a few micrometers for causing the liquid substance to adsorb on or absorb in the harvest leftovers.

The solid harvest leftovers may be corncobs, corn shucks, straw, barley straw, and the like.

In accordance with another mode of the invention, the method further comprises adjusting a pH value of the liquid substance by adding a pH regulating substance to the liquid substance for reducing a release of gases by the liquid substance. The pH regulators should preferably be environmentally acceptable substances, as for instance acetic acid, lime (slaked lime) or hydrogen peroxide.

The pH adjustment should be made before or during the introduction of the liquid substance into the grinder and blender, and the pH should be adjusted to between about 7.5 and about 9.

With the above-mentioned and other objects in view, there is also provided, in accordance with the invention, an apparatus for producing solid fertilizer, comprising a grinding and blending device;

harvest leftover supply means communicating with said grinding and blending device for supplying harvest leftovers to said grinding and blending device;

liquid substance supply means communicating with said grinding and blending device for supplying a liquid substance selected from the group consisting of liquid manure and sludge to said grinding and blending device;

said grinding and blending device including means for grinding the harvest leftovers to a particle size in the range of a few microns and for blending the ground harvest leftovers with the liquid substance.

The liquid substance supply means preferably include a storage tank, a supply line hydraulically connecting said storage tank to said grinding and blending device, and a pump connected in said supply line for pumping the liquid substance from said storage tank to said grinding and blending device.

The harvest leftover supply means preferably include a supply tank, a conveyor for conveying the harvest leftover to said grinding and blending device and a metering device communicating with said conveyor for metering the harvest leftover into said grinding and blending device.

The grinding and blending means preferably include a grinder and mixer operating with relative motion of machine elements selected from the group consisting of pinned disks, pendulum beaters, cross beaters, beater plates, eddy current rotors and rotors with a cutting knife.

The fertilizer, i.e. the manure or the sludge, is intimately blended in situ with harvest leftovers such as corncobs and corn shucks, barley straw, or with waste from other agricultural products. These solids are ground into fine particles (in the majority range of a few microns). The liquid manure or sludge is adsorbed on and absorbed in the solid particles, the surface of which, as a result of the comminution to particles having a diameter of a few micrometers, is activated to such high adsorption and absorption capacities that all the liquid manure is absorbed by the solid. A high-quality fertilizer can be produced with the process in which the fertilizer contains all the substances (nutrients for the soil) that are present in the grinding and mixing components, so that they are completely converted by the thus-fertilized soil.

A series of tests have been performed by this inventor. Harvest leftovers were ground into small and superfine particles and intimately blended with liquid manure, until we finally had a product in our hands whose quality as a solid fertilizer surprised even the professionals in the relevant Austrian federal government agencies, which we had asked to evaluate our product.

Even so, we had not quite reached our goal. There were problems associated with first grinding the waste dry and blending the resultant ground product with the liquid manure. Dry grinding involves the danger of explosion (dust explosion), if overly small particles (less than a tenth of a millimeter and down to a micrometer) are produced. Also, two machines were needed, one for grinding and one for the intimate blending, as well as apparatuses for manipulating the (dustlike) ground product, as well as protective provisions against dust explosions (such as the addition of inert gas).

Although fertilizer samples of considerable value and quality are produced in the laboratory in such processes, such a method can hardly be recommended for large-scale industrial use. Therefore we next introduced the waste together with the liquid substance into one and the same grinding apparatus and ground it in situ, and concurrently mixed the components intimately—the ground product and the liquid substance—with one another.

The resultant product and its quality greatly exceeded our expectations: The principle of the processes involved may be best understood in the light of mechanochemistry (also known as "tribochemistry"). See, for instance, "Mechanochemische Reaktionen" [Mechanochemical Reactions] by S. Pajakoff, Österr. Chemie-Zeitschr. [Austrian Chemical Journal] pp. 25–30, 1985. It is known that chemical reactions can be started or accelerated by beating, friction or impact, or in other words by supplying mechanical energy, i.e. by mechanical catalysis; it is also known that in (organic) substances upon comminution, not only is the surface area increased, but surface activation is also brought about, so that at the mechanically heavily strained points, the substances react more readily with surrounding media or components.

With respect to our method described here, this means that with the grinding of harvest waste to particles having particle sizes of 0.1 mm down to a few micrometers, the solids are activated for the maximum possible adsorption and reaction capability; hence chemical reactions of the organic contents of the liquid manure with the waste occur, and these reactions proceed so efficiently and quickly that the product can be spread as high-grade, high-quality fertilizer even without composting it first.

In order to verify the invention on an industrial scale, we built a pilot plant for the method and produced several tons of a fertilizer of this kind.

EXAMPLE

To illustrate the inventive nature, we measured the water retention capacity of long straw (□), chopped straw (X) and fine straw (at 21° C. and room atmosphere). The measurement results are graphed in the diagram of FIG. 3 with amount of retention (ml) graphed over time of retention (h). The fine straw was produced by grinding chopped straw into dustlike particles with a diameter of from less than 0.1 mm down to only a few micrometers. The first upper curve (a) shows the fertilizer prepared by dry grinding and subsequent blending with liquid manure in an agitator. The second upper curve (b) represents grinding and blending in situ, wet, with liquid manure.

In both versions (a) and (b) the particles exhibited particle sizes an$_u$ ruptured cell structures—studied under a light-optical microscope—which were identical to one another.

The exemplary tests very clearly illustrate the low retention capacity of long straw and chopped straw; long straw is what has been used for ages as bedding in rural livestock keeping, and chopped straw is recommended in the aforementioned document HUT04218. The water retention capacity of fine straw in accordance with experiment (a) is quite considerably better, according to which 35% of the water content was not drained off until after 18 hours. The object of the invention, conversely, is achieved only by version (b): only at the very beginning of observation can a water loss be ascertained (for practical use, however, this means merely that the prepared product should not be spread immediately after being removed from the grinding and blending machine but rather should be left to stand for a few hours); the liquid content beyond the "excess water" is bound by the process virtually inseparably in the product.

The method of the invention can be refined still further if liquid manure whose pH value is outside the range of approximately 7.5 to 9.0 is to be prepared; in those cases, environmentally acceptable pH regulators are recommended. Acceptable regulators are acetic acid (for general reduction of the pH value), or lime (as a base to raise the pH value); hydrogen peroxide may also be used.

The addition of lime to the liquid manure has already been proposed in the literature, for instance in German patent disclosure DE 39 27 486 (OMYA), although with a different object. The liquid manure, in that process, is initially pretreated from its natural form, with quick lime (CaO) in a container with an agitator mechanism.

In the composition of liquid manure and quick lime that results, fermentation begins after 1 to 2 hours under conditions of intensive ventilation, and after one day a foamy/creamy composition results. In a next method step, the composition is pumped into a once-through mixer, where from 500 to 1000 kg of solids (such as harvest leftovers, wood, or spoils) are admixed with it per cubic meter of composition, once these solid materials have been comminuted.

Although there is no explicit teaching as to the size of the particles in accordance with that method, claims 2 and 4 of the patent show that the material involved is "screened" excavation waste and "chopped" straw, bark, and the like, which is an indication that—similar to the teaching of the aforementioned document HUT04218—pieces of a few millimeters in size are needed.

The mixture of the liquid manure, pretreated with CaO, and solids should then, according to DE 39 27 486 A1, be placed on a dump for subsequent composting, where within eight days it is turned over several times and ventilated. All in all, several days pass, and several method steps must be performed, until the proposed product is created from the liquid manure. Whether this product is created without danger to the environment and can be used without reservation as fertilizer must be deemed questionable. This is because bacteriological reaction (fermentation after the addition of CaO) is recited, and it is further recommended that the ammonia gases (vapors) produced in the fermentation be caught and returned to the process. It is suspected that the release of gases is not prevented and that the retention of the "foamy/creamy composition" is greater than in the process described in the document HUT 04218, so that it must be feared that liquid manure, or the composition created from liquid manure and quick lime, will seep into the groundwater.

The problems involved in processing liquid manure and using it as fertilizer, as discussed above, are complex. The fundamental method in my invention described here solves these problems in a single method step efficiently, economically, and in an environment-friendly manner.

Other features which are considered as characteristic for the invention are set forth in the appended claims.

Although the invention is illustrated and described herein as embodied in a method and apparatus for producing solid fertilizer from liquid manure from livestock and from sludge, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
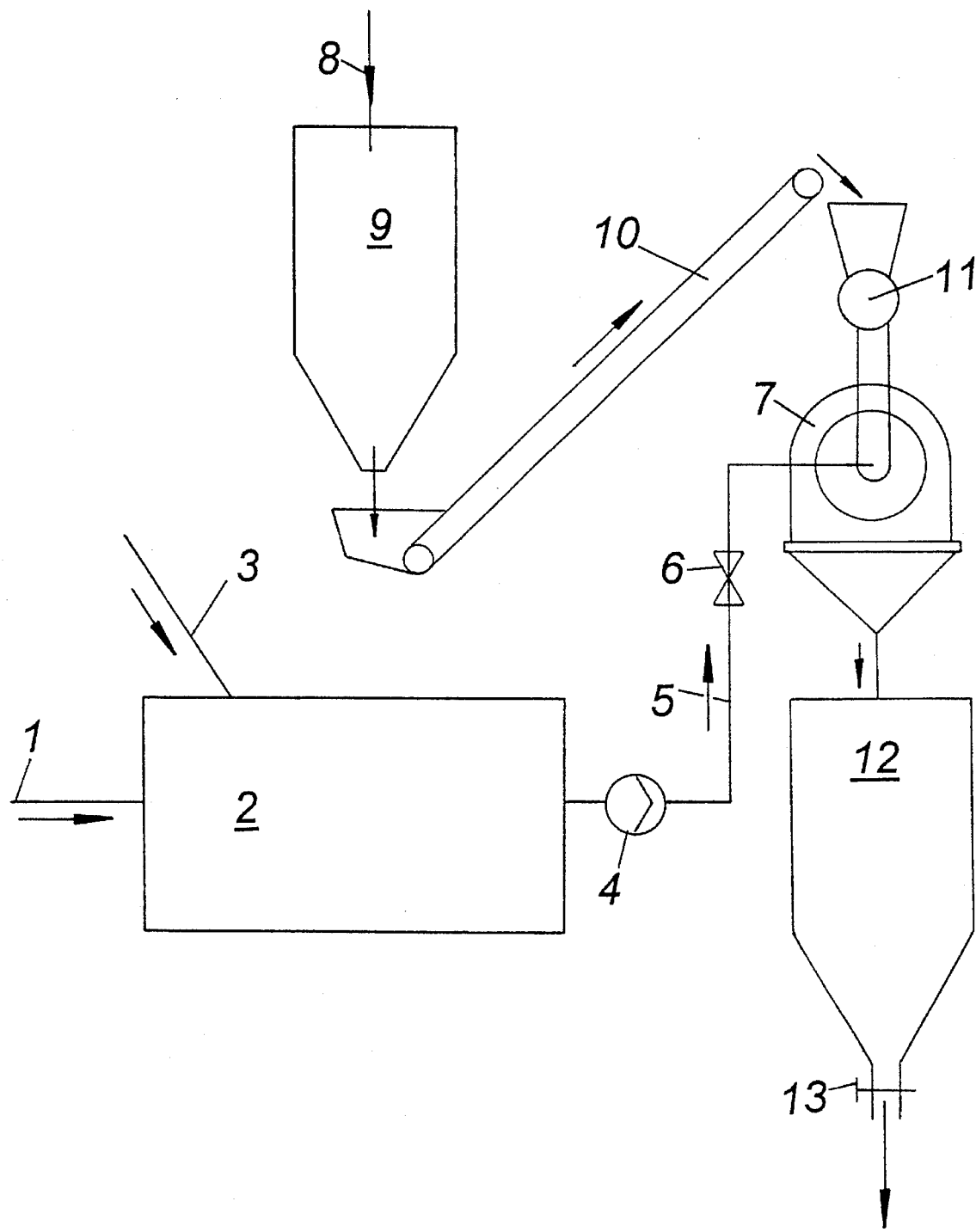
FIG. 1 is a schematic diagram of a system according to the invention.

Referring now to the figures of the drawing in detail and first, particularly, to FIG. 1 thereof, there is seen a feed line 1 through which the liquid manure to be prepared is delivered to a manure container 2. It is noted that this system is equally applicable to sludge treatment, but the exemplary embodiment is described particularly in view of manure produced by livestock. From the manure container, the liquid may be metered into the apparatus as the process proceeds. If the pH value of the liquid manure is below 7.5 or above 9.0, then it is useful to supply appropriate pH regulating substances. Such substances are added at a feed line 3, so that an optimal pH may be set in the liquid manure. Acceptable pH in the context of this process is usually in the range of 7.5 to 9.0. It is clear to those skilled in the art that environmentally compatible substances are to be fed in through the line 3, such as acetic acid (to lower the pH) or lime (as a base for raising the pH value), preferably slaked lime. These substances can be recommended as pH regulators.

The liquid manure is delivered from the container 2 with the aid of a pump 4 (for instance a Mohno pump), via a feed line 5 to a grinding and mixing machine 7. The feed quantity may be adjusted at a regulator valve 6. In the mixing machine 7, the liquid manure comes into contact with the harvest waste. The harvest waste had previously been temporarily stored in a supply container 9, at which it had arrived via an inlet 8. The solid waste is then fed with a pumping device 10 to a metering device 11. The metering device 11 is preferably a worm metering device or a cell wheel sluice. The metering device 11 then releases the metered solid waste to the grinding and mixing machine 7.

At that point, the solids are ground into particles whose diameter is in the range of a few microns. At the same time, the particles are blended in situ with the liquid manure. The resultant product is caught in the collecting container 12, from where it is removed through a flap 13.

Figure 2:
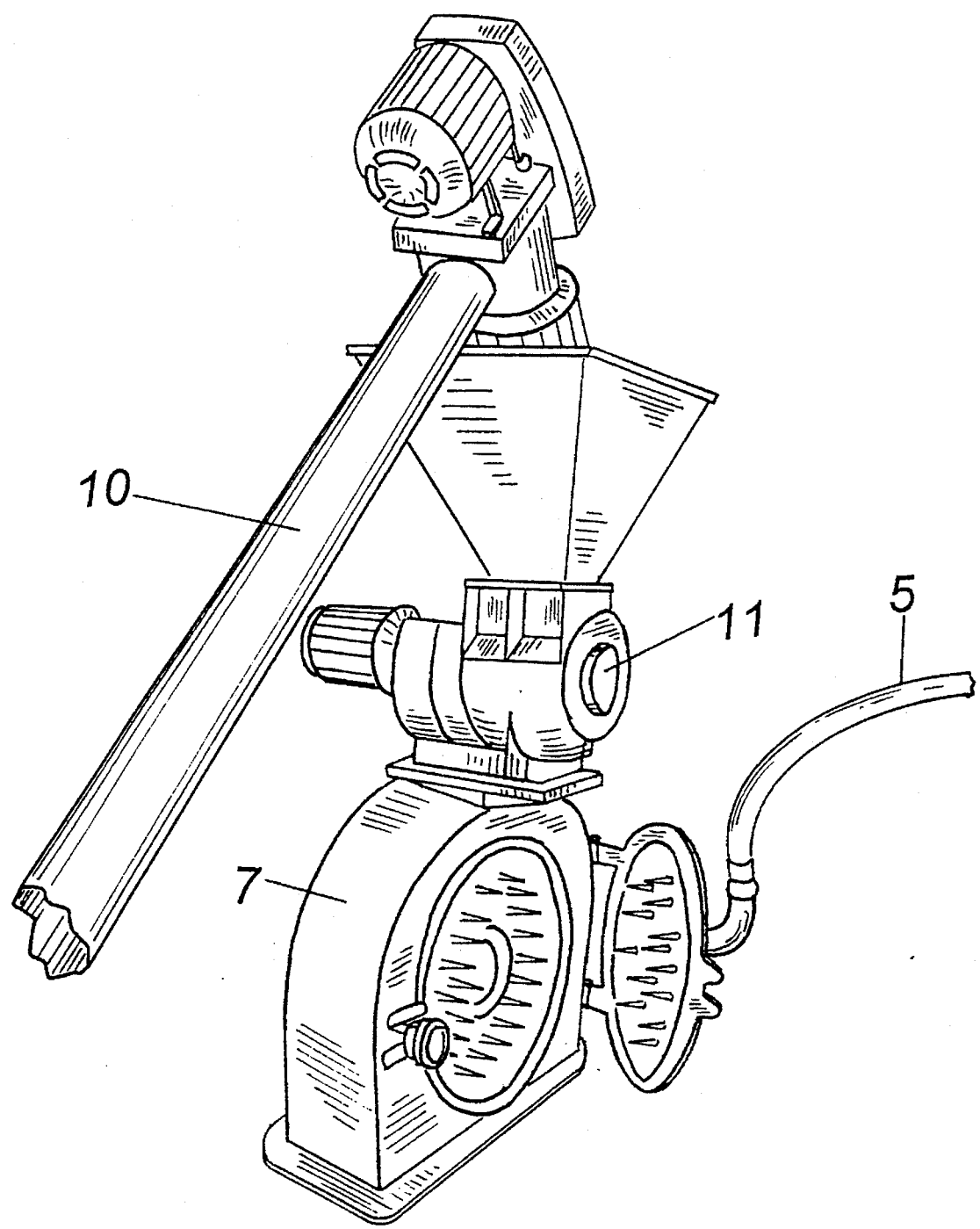
FIG. 2 is a perspective view of the apparatus of a preferred embodiment.
Figure 3:
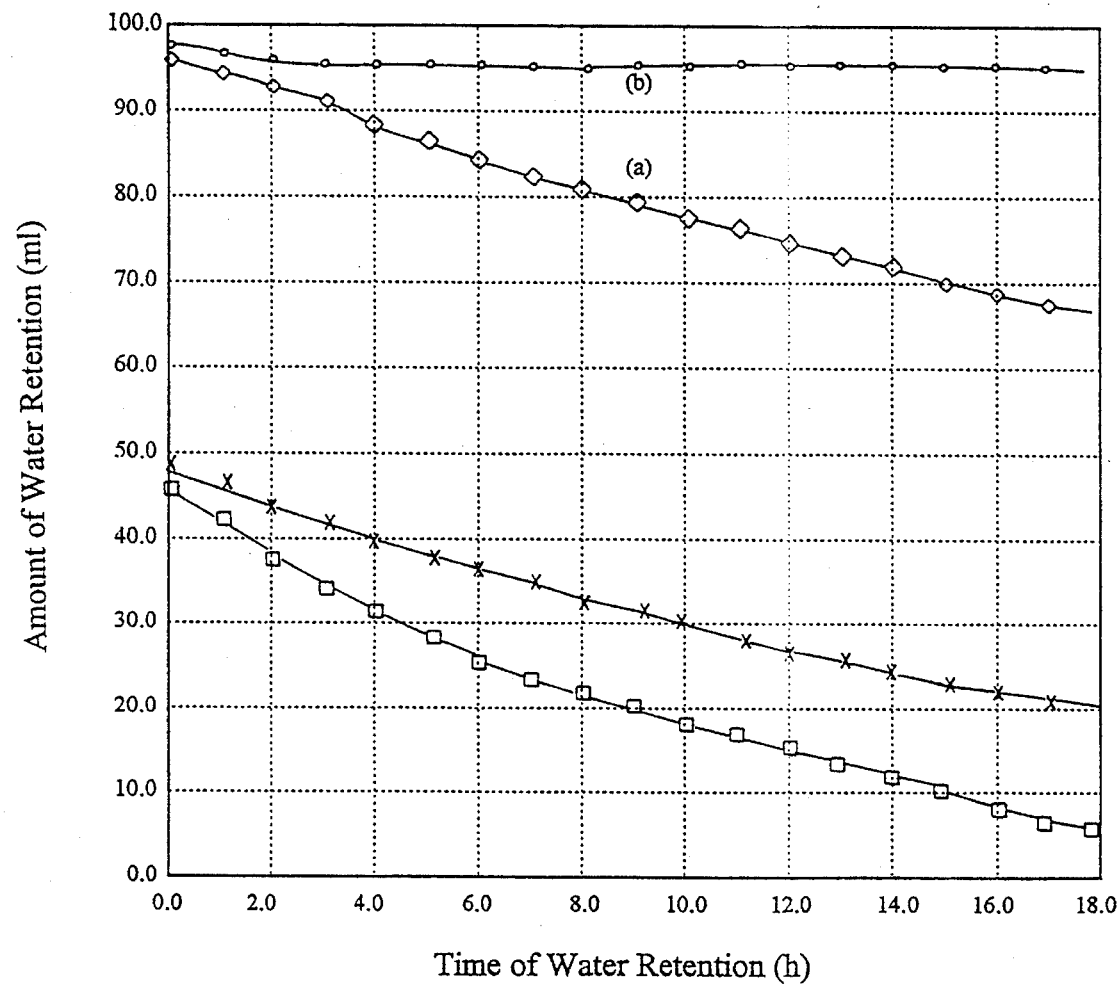
FIG. 3 is a graph illustrating water retention capacities of straw.

Referring now to FIG. 2, the grinding and mixing machine 7 is shown with the feed line 5 for the liquid manure and with the pumping device 10 issuing into a funnel disposed above the metering device 11 for the harvest waste. Pinned disks have proven very advantageous in the inventive process for grinding and in-situ blending. The pinned disks are shown attached in the (open) lid of mixer 7, and they are mounted on the rotor shaft. Many other possible comminuting tools are envisioned, however, instead of the pinned disks, namely pendulum beaters, cross beaters or beater plates, eddy current rotors, or cutting knives.

At a speed of about 600 rpm, a grinding and mixing machine with a throughput of approximately 2000 l of liquid manure per hour can prepare up to 600 kg of harvest waste per hour; the requisite drive power is on the order of magnitude of 20 kW. The quality of the fertilizer thus produced meets the requirements of the published Austrian norm ÖNORM S 2200. Accordingly, the fertilizer is environmentally friendly and it satisfies even the most stringent quality controls.

The same quality of product is obtained in the case of fertilizer produced from sludge. Such a device is provided with a comminuting and blending device operating at approximately 5000 l/h of sludge throughput with about 750 kg/h of harvest waste (for instance barley straw). If the liquid sludge waste is loaded with environmentally hazardous materials, as for example heavy metals, those materials may be removed from the sludge in a preceding process step, i.e. before entering the transport device 10. Those substances may then be removed from the sludge and either deposited or further processed.

I claim:

1. An apparatus for producing solid fertilizer, comprising a grinding and blending device;

harvest leftover supply means communicating with said grinding and blending device for supplying harvest leftovers to said grinding and blending device;

liquid substance supply means communicating with said grinding and blending device for supplying a liquid substance selected from the group consisting of liquid manure and sludge to said grinding and blending device;

said grinding and blending device including means for grinding the harvest leftovers to a particle size in the range of a few microns and for simultaneously absorbing the liquid substance in the ground harvest leftovers for forming solid fertilizer.

2. The apparatus according to claim 1, wherein said liquid substance supply means include a storage tank, a supply line hydraulically connecting said storage tank to said grinding and blending device, and a pump connected in said supply line for pumping the liquid substance from said storage tank to said grinding and blending device.

3. The apparatus according to claim 1, wherein said harvest leftover supply means include a supply tank, a conveyor for conveying the harvest leftover to said grinding and blending device and a metering device communicating with said conveyor for metering the harvest leftover into said grinding and blending device.

4. The apparatus according to claim 1, wherein said grinding and blending means include a grinder and mixer operating with relative motion of machine elements selected from the group consisting of pinned disks, pendulum beaters, cross beaters, beater plates, and rotors with a cutting knife.

5. The apparatus according to claim 1, wherein said grinding and blending means include an eddy current rotor.

* * * * *